(12) United States Patent
Hamm et al.

(10) Patent No.: US 11,835,120 B2
(45) Date of Patent: Dec. 5, 2023

(54) CONTINUOUSLY VARIABLE TRANSMISSION CLUTCH

(71) Applicant: TEAM Industries, Inc., Bagley, MN (US)

(72) Inventors: Christopher David Hamm, Solway, MN (US); Shane Clair Okeson, Bagley, MN (US); Canaan Wray Ricke, Roy Lake, MN (US); Gregory J. Adkins, Clearbrook, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 18/055,967

(22) Filed: Nov. 16, 2022

(65) Prior Publication Data

US 2023/0160438 A1 May 25, 2023

Related U.S. Application Data

(60) Provisional application No. 63/281,165, filed on Nov. 19, 2021.

(51) Int. Cl.
*F16H 55/56* (2006.01)
*F16D 11/00* (2006.01)

(52) U.S. Cl.
CPC ...... *F16H 55/563* (2013.01); *F16D 2011/006* (2013.01); *F16D 2500/10412* (2013.01)

(58) Field of Classification Search
CPC ..... F16H 55/563; F16H 61/66245; F16H 9/18
USPC ..................................................... 474/13, 15
See application file for complete search history.

(56) References Cited

U.S. PATENT DOCUMENTS

| | | | | | |
|---|---|---|---|---|---|
| 2,260,795 | A | * | 10/1941 | Burns | F16H 61/66245 474/46 |
| 3,287,987 | A | * | 11/1966 | Getz | F16H 55/56 474/46 |
| 3,395,587 | A | * | 8/1968 | Casini | F16H 61/66227 474/15 |
| 3,599,504 | A | * | 8/1971 | Taylor | F16H 61/66227 474/15 |
| 3,680,403 | A | * | 8/1972 | Schupan | F16H 61/66245 474/13 |
| 3,685,366 | A | * | 8/1972 | Schupan | F16H 55/563 180/190 |
| 3,757,593 | A | * | 9/1973 | Svenson | B62M 25/00 192/48.92 |

(Continued)

*Primary Examiner* — Henry Y Liu
(74) *Attorney, Agent, or Firm* — Fogg & Powers LLC

(57) ABSTRACT

A CVT clutch is provided. A fixed sheave of the CVT clutch is statically mounted on an end of the post. A movable sheave assembly is dynamically mounted on the post. The movable sheave includes a recess cavity that is defined by a movable sheave housing. A spider is statically mounted on the post within the recess cavity of the movable sheave assembly. At least one interchangeable ramp is positioned within the recess cavity so that at least one space is provided between the at least one interchangeable ramp and a sheave face of the movable sheave housing. An engagement member is positioned to engage an associated interchangeable ramp and the spider. A main bias member is configured to assert a bias force on the spider and cover to position each engagement member at a select location on the associated interchangeable ramp when a countering force is not present.

20 Claims, 19 Drawing Sheets

(56) References Cited

U.S. PATENT DOCUMENTS

| | | | | |
|---|---|---|---|---|
| 3,786,688 A * | 1/1974 | Svenson | F16H 61/66245 | 474/46 |
| 3,975,964 A * | 8/1976 | Adams | F16H 61/66245 | 474/15 |
| 4,102,214 A * | 7/1978 | Hoff | F16H 55/563 | 474/12 |
| 4,310,322 A * | 1/1982 | Beck | F16H 61/66227 | 474/46 |
| 4,345,664 A * | 8/1982 | Anno | B62M 9/06 | 474/45 |
| 4,384,862 A * | 5/1983 | Nakane | F16H 61/66245 | 192/105 B |
| 4,406,644 A * | 9/1983 | Kinbara | F16H 61/66245 | 474/13 |
| 4,515,575 A * | 5/1985 | Kinbara | F16H 61/66227 | 474/11 |
| 5,108,347 A * | 4/1992 | Gourdon | F16H 55/563 | 474/13 |
| 5,188,568 A * | 2/1993 | Gourdon | F16H 55/563 | 474/43 |
| 5,209,703 A * | 5/1993 | Mastine | F16H 55/563 | 474/70 |
| 5,328,413 A * | 7/1994 | Robert | F16H 55/563 | 474/13 |
| 5,458,539 A * | 10/1995 | Landry | F16H 55/563 | 474/46 |
| 5,529,544 A * | 6/1996 | Berto | F16H 61/66245 | 474/11 |
| 5,562,555 A * | 10/1996 | Peterson | F16H 55/563 | 192/105 CD |
| 5,647,810 A * | 7/1997 | Huddleston | F16H 55/563 | 384/126 |
| 6,086,492 A * | 7/2000 | Nakano | F16H 55/563 | 477/44 |
| 6,102,399 A | 8/2000 | Kifer | | |
| 6,520,878 B1 * | 2/2003 | Leclair | F16H 55/563 | 474/14 |
| 6,743,129 B1 * | 6/2004 | Younggren | F16H 55/56 | 474/19 |
| 7,172,523 B2 * | 2/2007 | Borghi | F16H 63/067 | 474/14 |
| 7,637,828 B2 * | 12/2009 | Murayama | F16H 57/04 | 474/14 |
| 7,803,074 B2 * | 9/2010 | Ishida | F16H 55/563 | 474/8 |
| 8,496,551 B2 * | 7/2013 | Mueller | F16H 7/02 | 474/17 |
| 9,518,641 B2 * | 12/2016 | Mariotti | F16H 55/563 | |
| 10,054,211 B2 * | 8/2018 | Zulawski | F16H 55/56 | |
| 10,422,417 B2 * | 9/2019 | Wu | F16H 9/12 | |
| 10,487,930 B2 * | 11/2019 | Okeson | F16H 15/52 | |
| 10,830,350 B2 * | 11/2020 | Wu | F16H 61/66245 | |
| 10,865,860 B2 * | 12/2020 | Mariotti | F16H 9/18 | |
| 11,396,930 B2 * | 7/2022 | Aitcin | F16H 9/14 | |
| 2001/0034280 A1 * | 10/2001 | Kuga | F16H 9/18 | 474/8 |
| 2005/0064968 A1 * | 3/2005 | Robert | F16H 63/067 | 474/12 |
| 2006/0258492 A1 * | 11/2006 | Wu | F16H 55/563 | 474/13 |
| 2008/0125256 A1 * | 5/2008 | Murayama | F16H 57/04 | 180/219 |
| 2010/0216556 A1 * | 8/2010 | Mondragon-Parra | F16D 3/2055 | 464/111 |
| 2015/0111674 A1 * | 4/2015 | Yuan | F16H 63/067 | 474/14 |
| 2016/0069434 A1 * | 3/2016 | Aitcin | B62M 9/08 | 180/54.1 |
| 2017/0030454 A1 * | 2/2017 | Aitcin | F16H 55/36 | |
| 2018/0363748 A1 * | 12/2018 | Okeson | F16H 61/66245 | |
| 2021/0324946 A1 * | 10/2021 | Moine | F16H 9/14 | |

\* cited by examiner

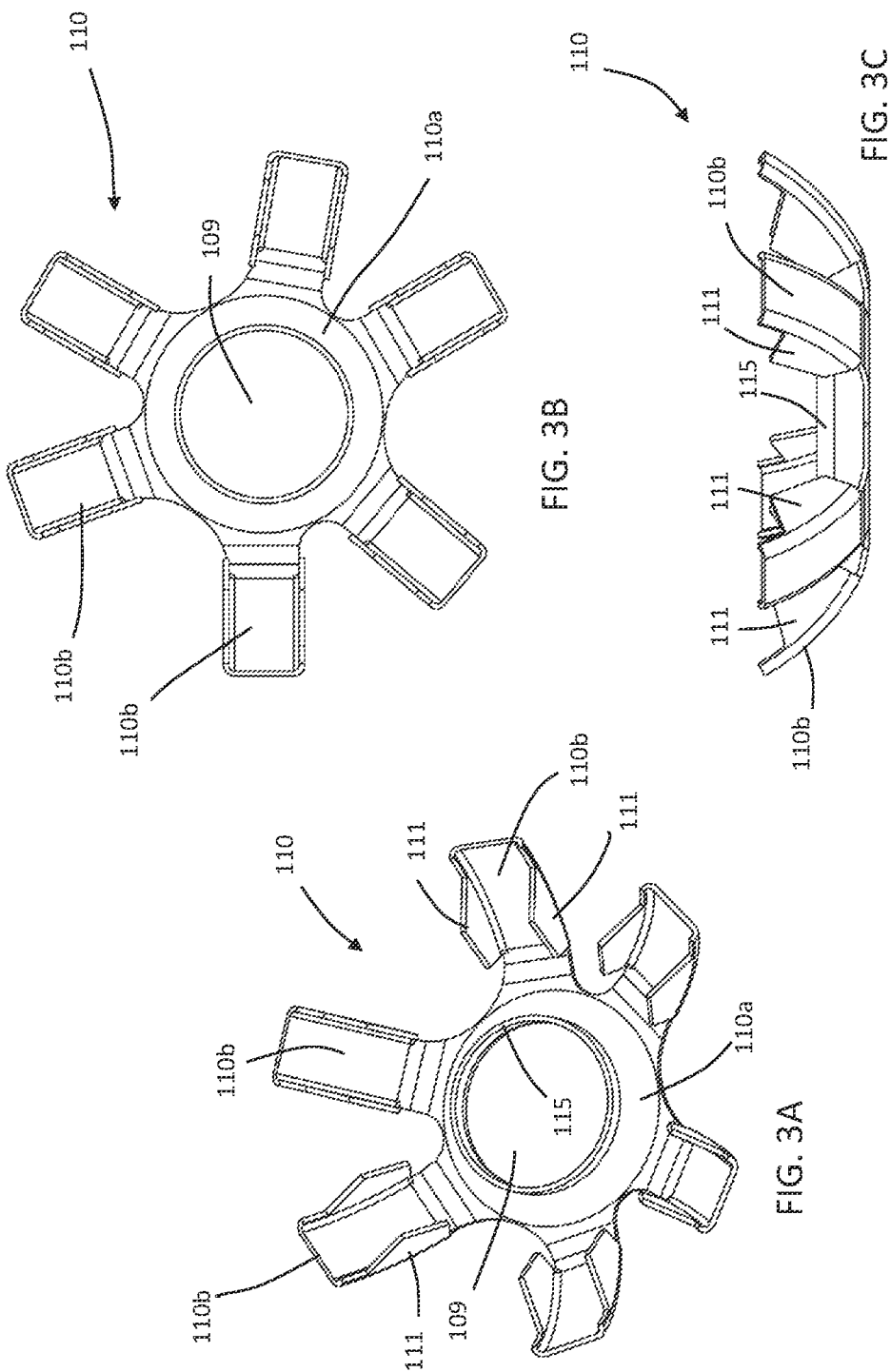

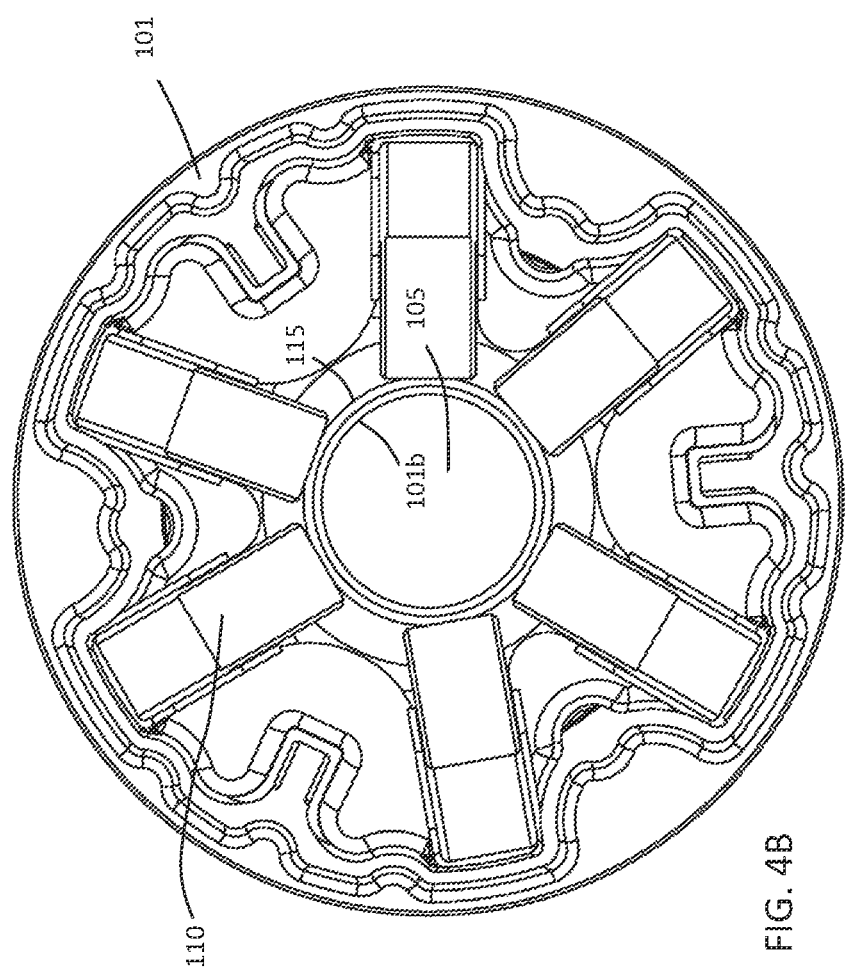

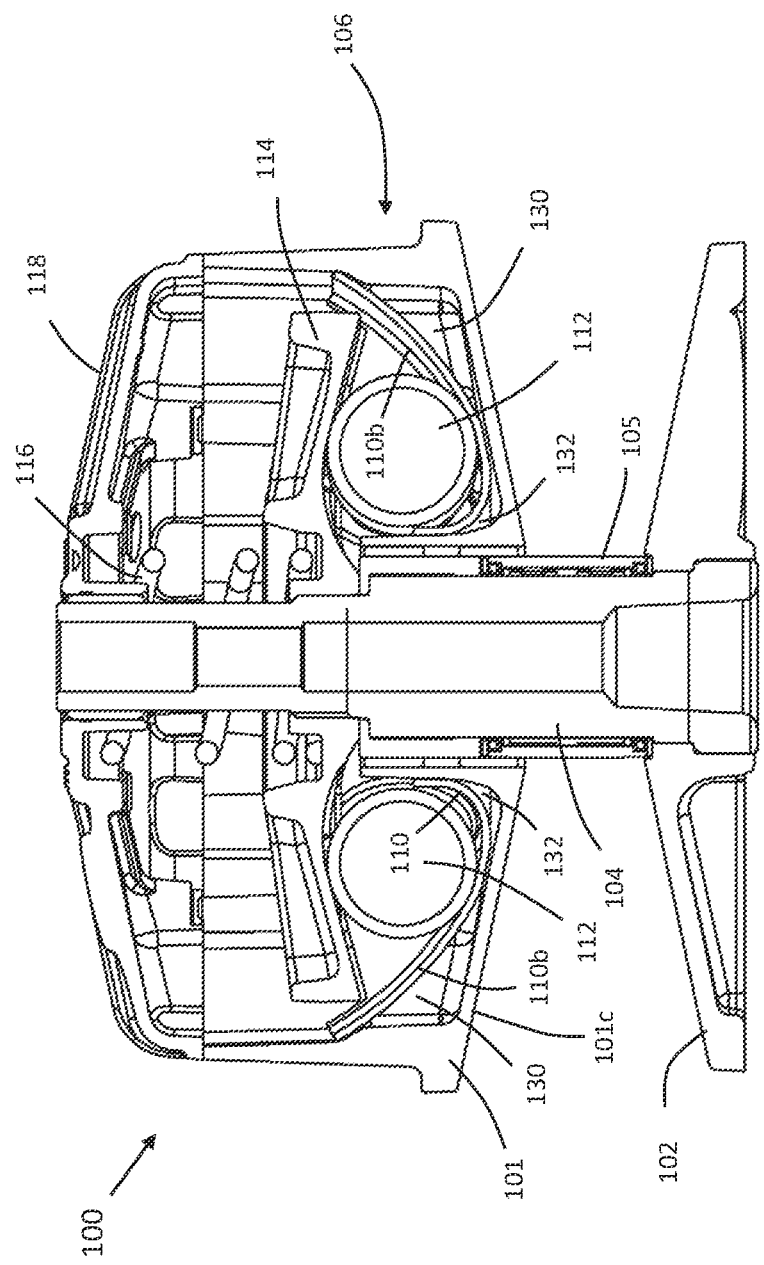

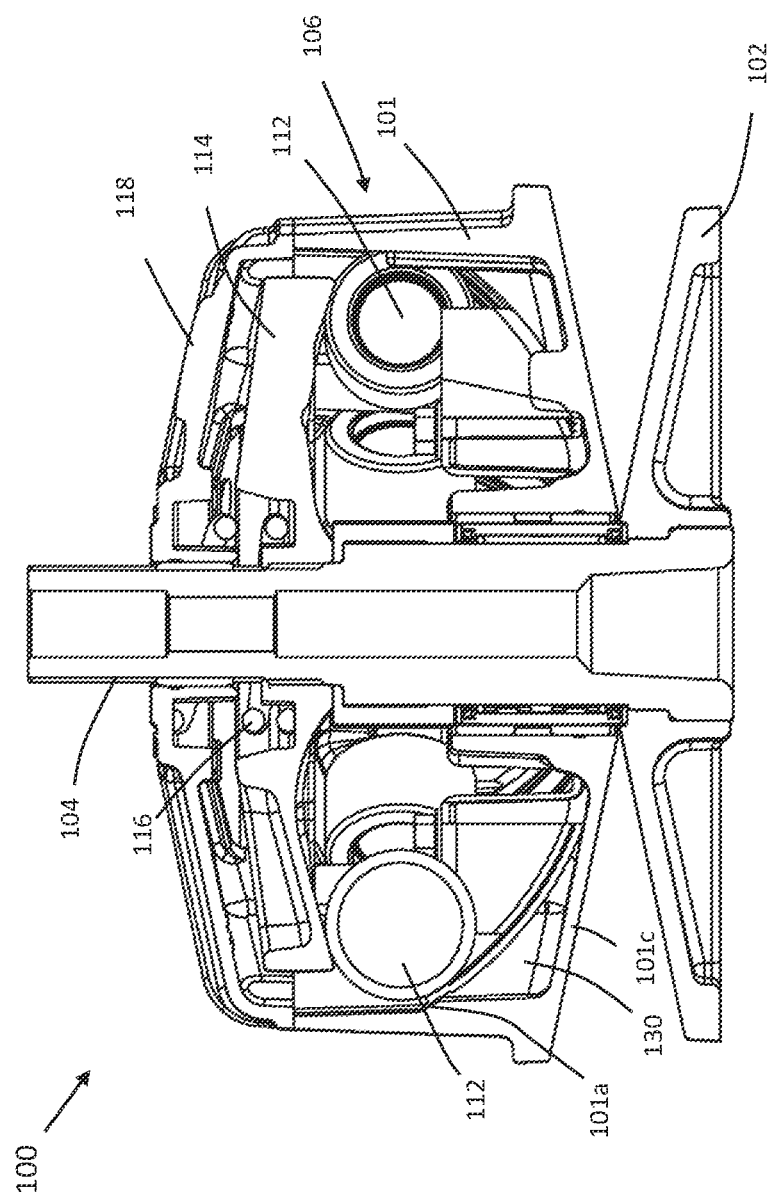

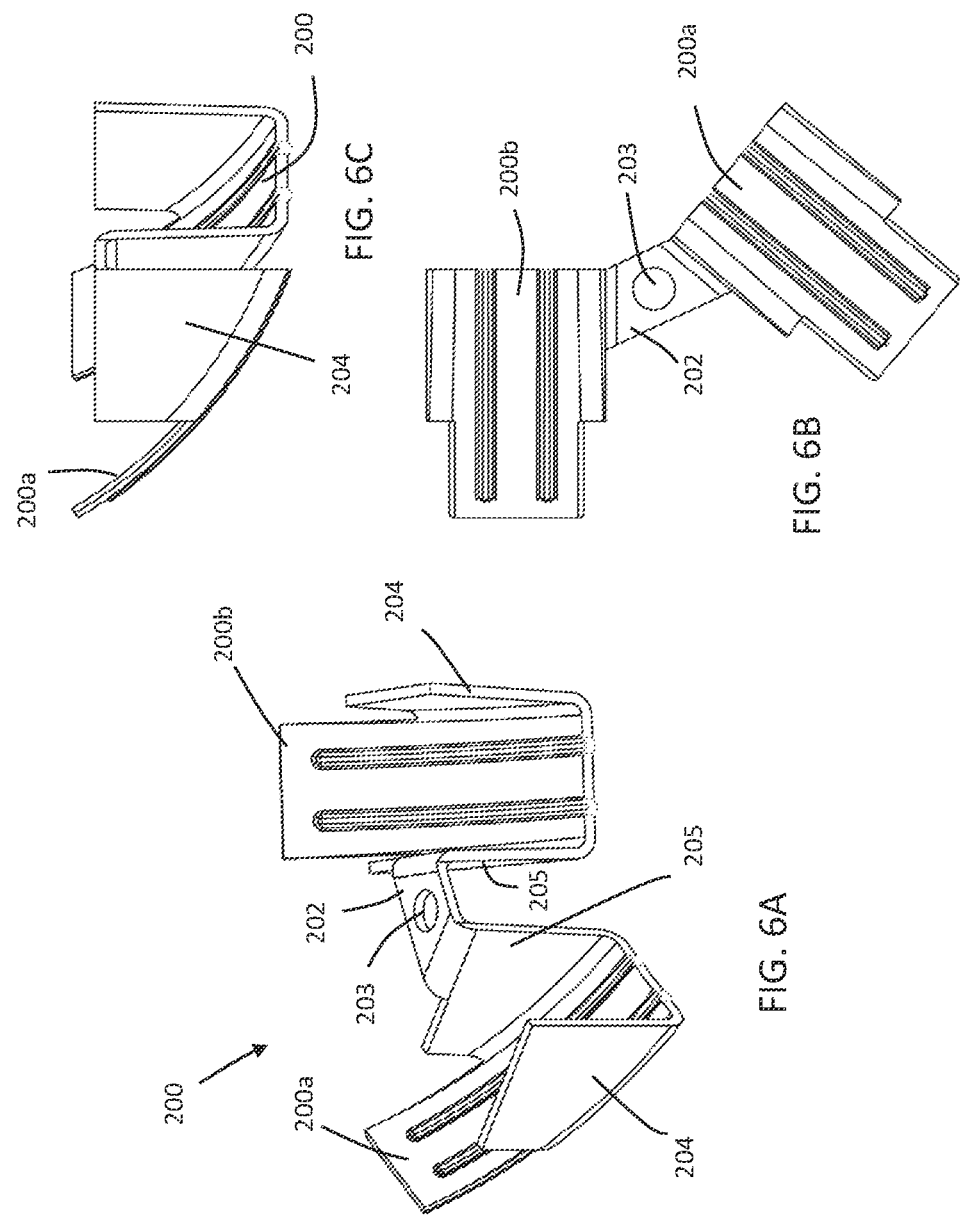

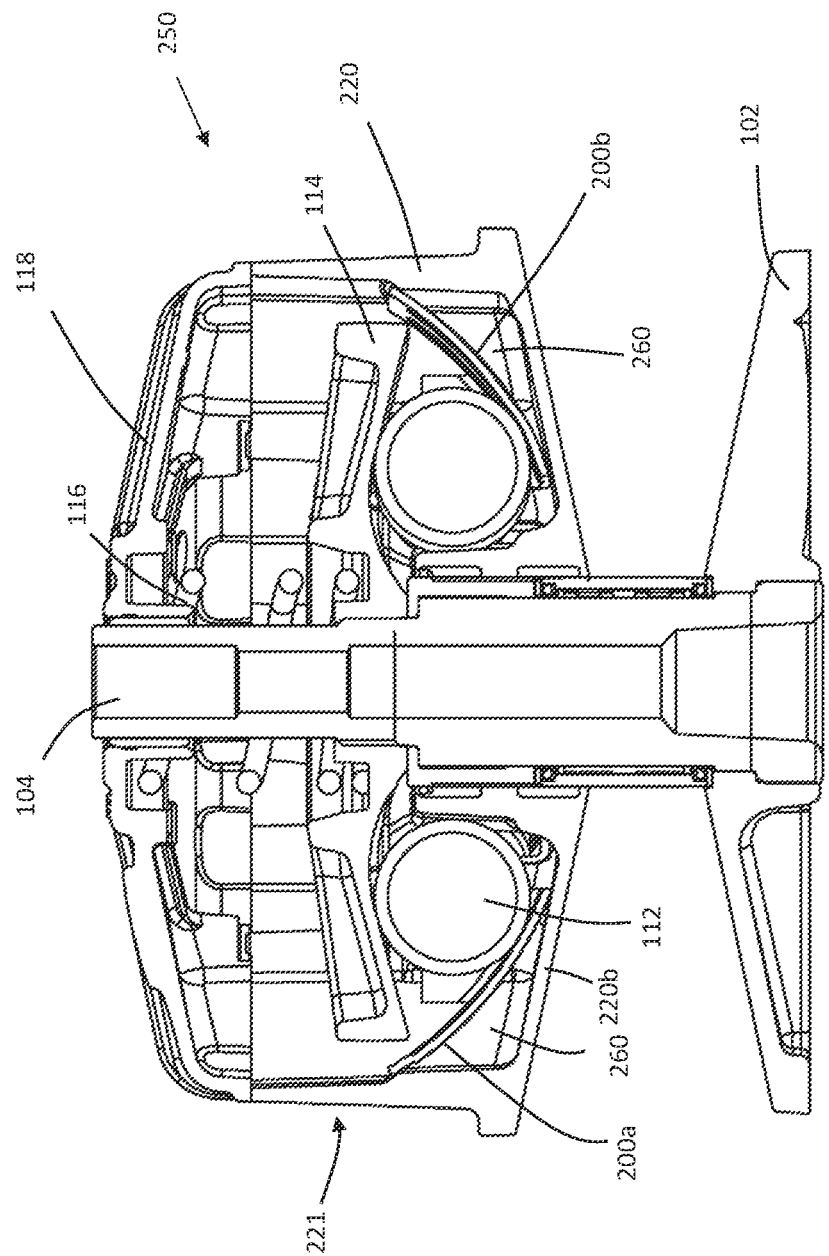

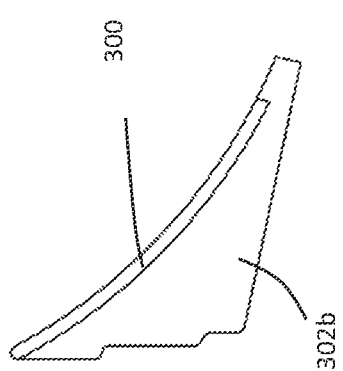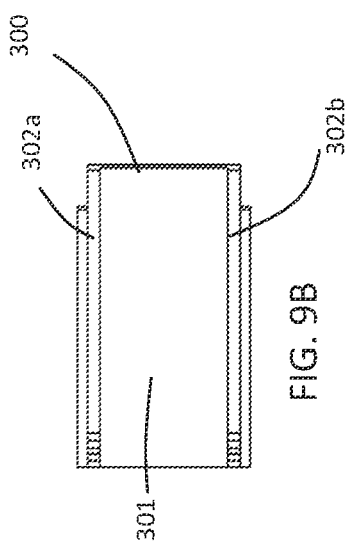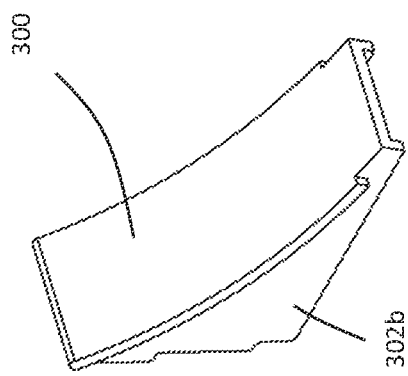

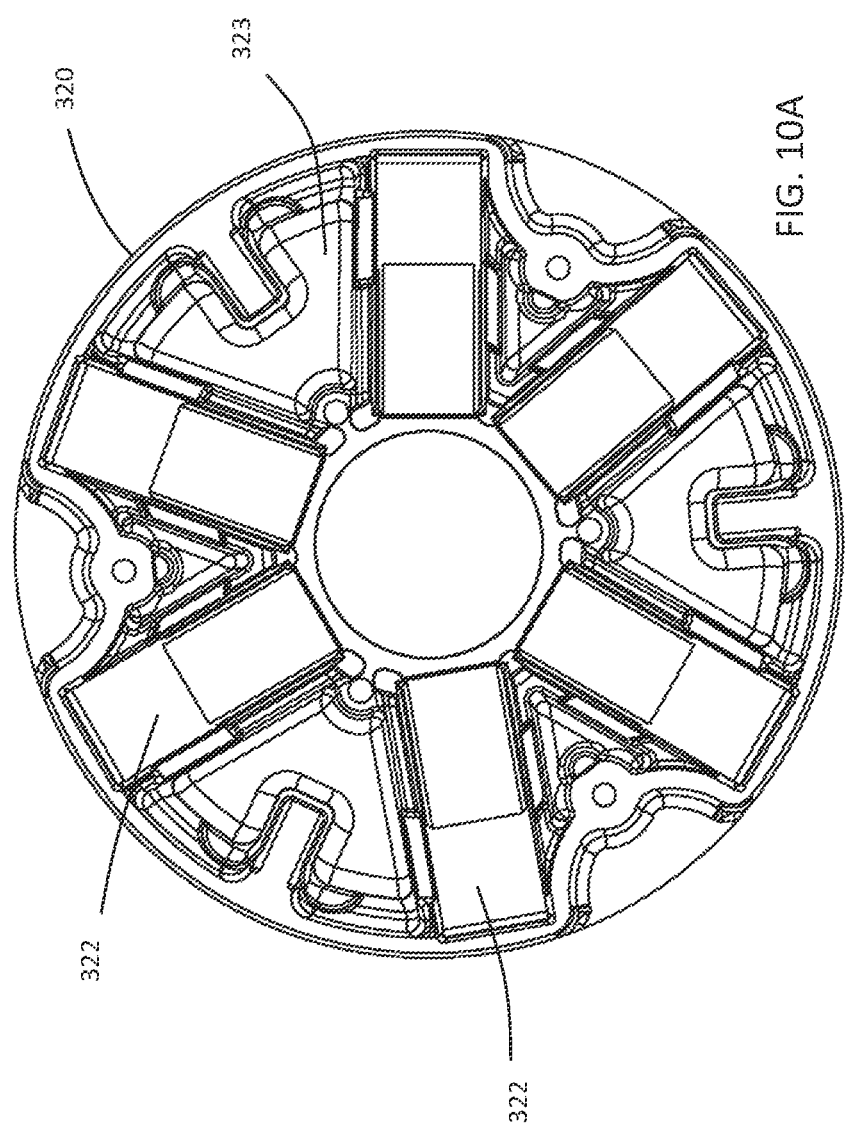

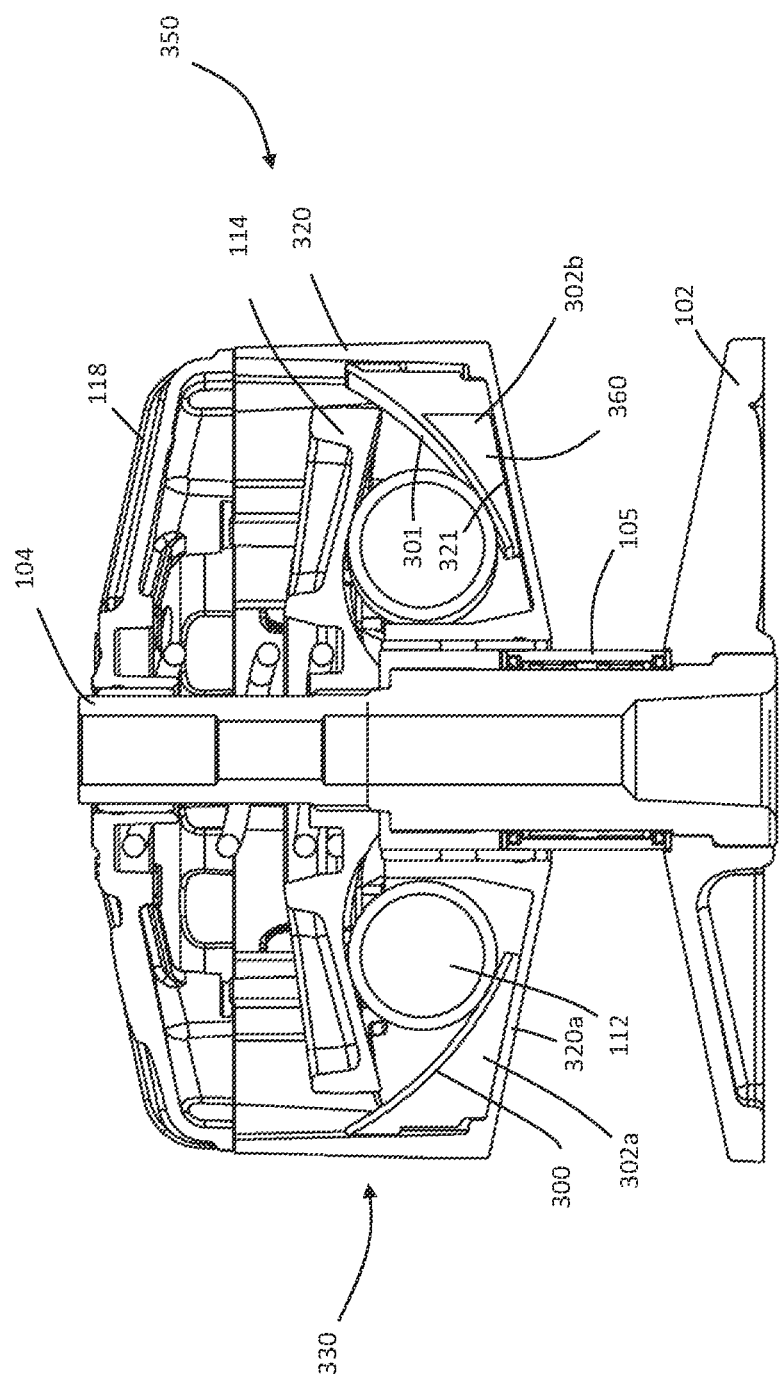

CONTINUOUSLY VARIABLE TRANSMISSION CLUTCH

CROSS-REFERENCE TO RELATED APPLICATIONS

This application claims priority to U.S. Provisional Application No. 63/281,165 filed on Nov. 19, 2021, with the same title herewith, the contents of which are incorporated herein in its entirety.

BACKGROUND

A continuously variable transmission (CVT) is used in many different types of vehicles. A CVT changes transmission ratio between an engine output and a drivetrain of the vehicle. In a typical CVT system, a primary clutch, drive clutch or drive pulley is coupled to receive a rotational output from an engine and a secondary clutch, driven clutch or driven pulley is coupled to provide a rotational output to the drivetrain. The primary clutch is typically in operational communication to provide torque to the secondary clutch with an endless loop drive belt. In changing transmission ratios, a CVT clutch may be comprised of a fixed and a movable sheave, each sheave having conical-faced sheave portions. The movable sheave is configured to move in relation to the fixed sheave axially along an axis of rotation. In this system, the distance between the sheaves of the clutch determines the positioning of the drive belt in relation to the rotational axis and hence the transmission ratio. In particular, the closer the first and second sheave portions are positioned together, the farther the drive belt is pinched on the conical-faces away from the rotational axis of the primary clutch. Likewise, the farther the first and second sheave portions are positioned away from each other, the closer the drive belt is to the rotational axis of the primary clutch. When the engine is at idle speeds, the first and second sheaves of the primary clutch are axially positioned at a select distance from each other so at least one of the conical faced sheave portions does not engage a side of the drive belt. In this situation, the limited or lack of friction between the drive belt and the clutch removes force on the belt so no rotational force is transmitted between the clutches and hence no power is provided to the drivetrain by the engine.

In controlling the axial movement of the movable sheave assembly, a centrifugal system may be used to cause the moveable sheave to move axially toward the fixed sheave as the rotational speed of clutch increases. One type of centrifugal system uses a ramp and engagement member arrangement. In a ramp/engagement member arrangement, the shifting characteristics of the clutch is defined at least in part on the ramp surface profile of the ramp. It is desirable to change the shifting characteristics of a CVT without having to replace one of the clutches of the CVT.

For the reasons stated above and for other reasons stated below which will become apparent to those skilled in the art upon reading and understanding the present specification, there is a need in the art for a CVT design that allows for an effective and efficient way to change the shifting characteristics of a CVT clutch.

SUMMARY OF INVENTION

The following summary is made by way of example and not by way of limitation. It is merely provided to aid the reader in understanding some of the aspects of the subject matter described. Embodiments provide a CVT clutch design with replaceable ramps so that that shifting characteristics of the clutch may be changes in an effective and efficient manner. Further some embodiments provide a CVT clutch with desired heat dissipating characteristics.

In one embodiment, a CVT clutch including a post, a fixed sheave, a movable sheave, a cover, a spider, at least one interchangeable ramp, an engagement member for each interchangeable ramp and a main bias member is provided. The fixed sheave is statically mounted on an end of the post. The movable sheave assembly is dynamically mounted on the post. The movable sheave includes a recess cavity that is defined by a movable sheave housing. The cover is selectively coupled to the movable sheave housing to cover the recess cavity of the movable sheave assembly. The spider is statically mounted on the post within the recess cavity of the movable sheave assembly. The at least one interchangeable ramp is positioned within the recess cavity so that at least one space is provided between the at least one interchangeable ramp and a sheave face of the movable sheave housing. Each engagement member is positioned to engage an associated interchangeable ramp and the spider. The main bias member is configured to assert a bias force on the spider and cover to position each engagement member at a select location on the associated ramp when a countering force is not present.

In another example embodiment, a CVT clutch including a post, a fixed sheave, a movable sheave, a cover, a spider, an interchangeable ramp assembly, an engagement member for each ramp of the interchangeable ramp assembly and a main bias member is provided. The fixed sheave is statically mounted on an end of the post. The movable sheave assembly is dynamically mounted on the post. The movable sheave includes a recess cavity defined by a movable sheave housing. The cover is selectively coupled to the movable sheave housing to cover the recess cavity of the movable sheave assembly. The spider is statically mounted on the post within the recess cavity of the movable sheave assembly. The interchangeable ramp assembly is received within the recess cavity. The interchangeable ramp assembly includes a central base portion with a ramp assembly central passage and a plurality of spaced radially extending ramps. Each engagement member is positioned to engage an associated ramp and the spider. The main bias member is configured to assert a bias force on the spider and cover to position each engagement member at a select location on the associated ramp.

In yet another embodiment, a vehicle with a continuously variable transmission (CVT) clutch, the vehicle including a motor to generate engine torque, a CVT and a drivetrain operationally coupled to the CVT is provided. The CVT is operationally coupled to the motor. The CVT includes the CVT clutch. The CVT clutch includes a post, a fixed sheave, a movable sheave, a cover, a spider, at least one interchangeable ramp, an engagement member for each interchangeable ramp, and a main bias member. The fixed sheave is statically mounted on an end of the post. The movable sheave assembly is dynamically mounted on the post. The movable sheave includes a recess cavity defined by a movable sheave housing. The cover is selectively coupled to the movable sheave housing to cover the recess cavity of the movable sheave assembly. The spider is statically mounted on the post within the recess cavity of the movable sheave assembly. The at least one interchangeable ramp is received within the recess cavity. The at least one interchangeable ramp is positioned within the recess cavity so that at least one space is provided between the at least one interchangeable ramp and a sheave face of the movable sheave housing. Each engagement member is positioned to engage an associated interchangeable ramp and the spider. The main bias member is configured to assert a bias force on the spider and cover to position each engagement member at a select location on the associated interchangeable ramp. The drivetrain is operationally coupled to the CVT.

BRIEF DESCRIPTION OF THE DRAWINGS

The present invention can be more easily understood and further advantages and uses thereof will be more readily apparent, when considered in view of the detailed description and the following figures in which:

FIG. 3A is an end perspective view of a ramp assembly of one according to one exemplary embodiment;

FIG. 3B is an end view of the ramp assembly of FIG. 3A;

FIG. 3C is a side view of the ramp assembly of FIG. 3A;

FIG. 4B is an end view of the movable sheave housing of FIG. 4B including the ramp assembly of FIG. 3A;

FIG. 5A is a cross-sectional side view of the CVT clutch of FIG. 1 in an idle configuration;

FIG. 5B is a cross-sectional side view of the CVT clutch of FIG. 1 in a top end configuration;

FIG. 6A is a side perspective view of a ramp portion according to one exemplary embodiment;

FIG. 6B is an end view of the ramp portion of FIG. 6A;

FIG. 6C is a side perspective view of the ramp portion of FIG. 6A;

FIG. 8A is a cross-sectional side view of a CVT clutch that includes the ramp portions of the FIG. 6A in an idle configuration according to one exemplary embodiment;

FIG. 9A is a side perspective view of a ramp according to one exemplary embodiment;

FIG. 9B is an end view of the ramp portion of FIG. 9A;

FIG. 9C is a side perspective view of the ramp portion of FIG. 9A;

FIG. 10A is an end view of a movable sheave housing according to one exemplary embodiment;

FIG. 11A is a cross-sectional side view of a CVT clutch that includes the ramp portions of the FIG. 9A in an idle configuration according to one exemplary embodiment;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a CVT clutch that includes replaceable ramps. By replacing ramps having a select ramp profile with other ramps with another ramp profile, the shifting characteristics of the CVT clutch can be changed in an efficient and effective manner. Some embodiments also provided a CVT clutch with a design that insolates engagement members, such as but not limited to, rollers of the CVT clutch from excessive heat with at least one space (or gap) located between ramps that engage the engagement members and a sheave face of a movable sheave housing of the CVT clutch.

Figure 1:
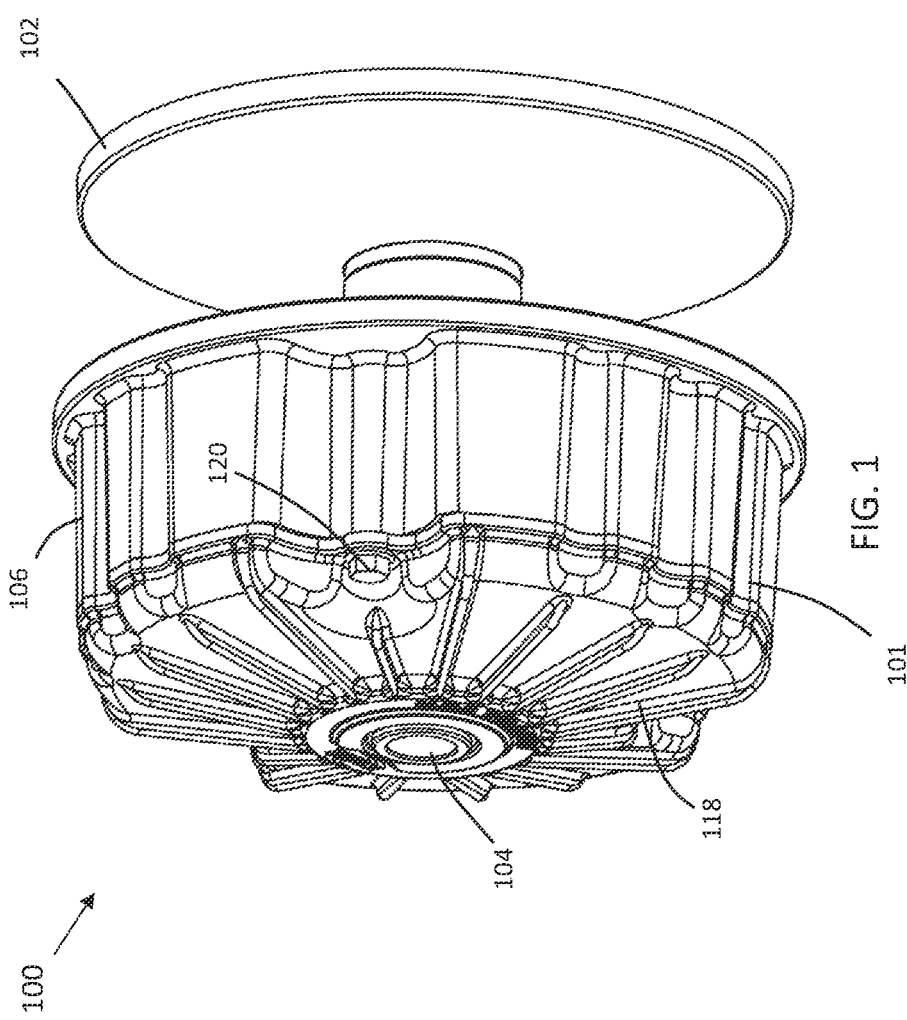
FIG. 1 is a side perspective view of a CVT clutch of according to one exemplary embodiment.

Referring to FIG. 1, a side perspective assembled view of a CVT clutch 100 of one example, is illustrated. The CVT clutch 100 includes a fixed sheave 102 and a movable sheave assembly 106. The fixed sheave 102 is usually statically mounted on an end of a post 104 while the movable sheave assembly 106 is dynamically mounted on the post 104. A cover 118 is coupled to a movable sheave housing 101 of the movable sheave assembly 106 via fasteners 120.

Figure 2:
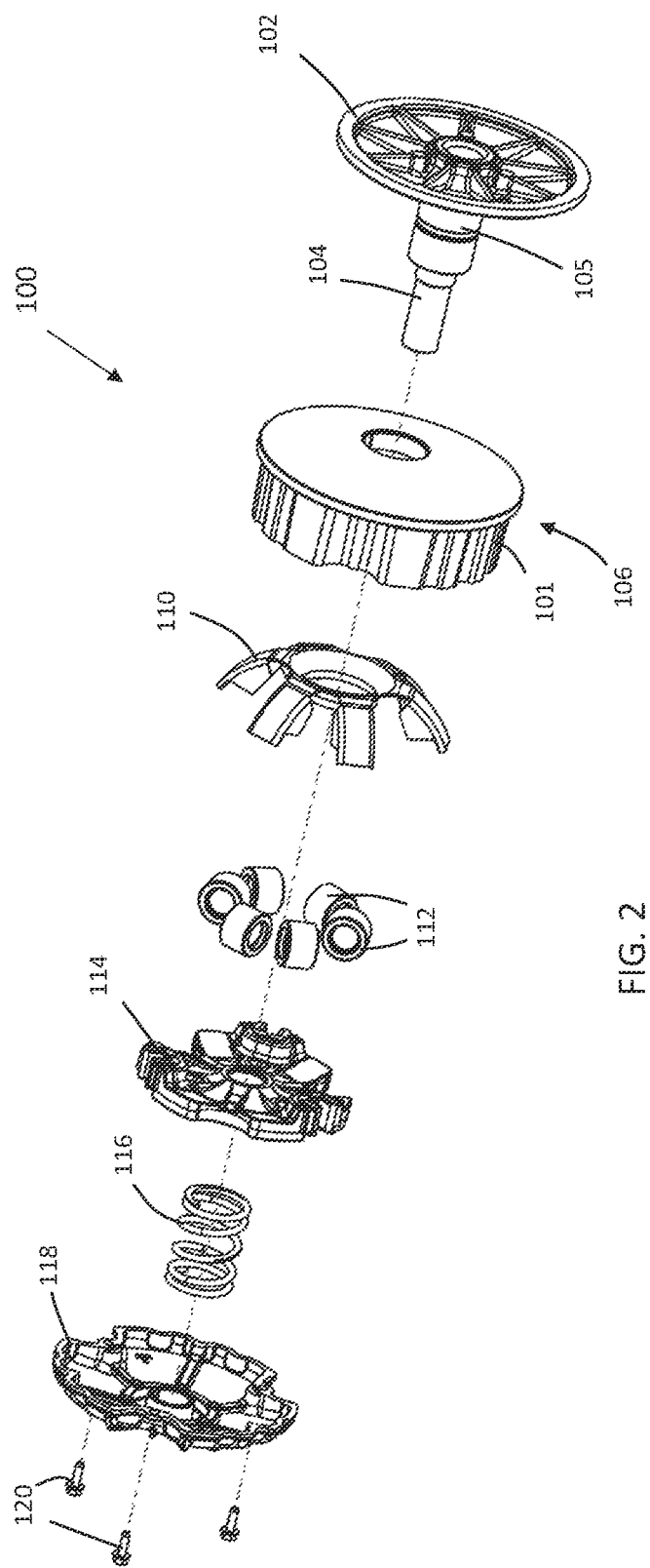
FIG. 2 is an unassembled side view of the CVT clutch of FIG. 1.

Referring to FIG. 2, an unassembled view of the CVT clutch 100 is illustrated. The CVT clutch 100 of this example includes the fixed sheave 102 and the post 104. As discussed above, the fixed sheave 102 is mounted on an end of the post 104. Further received on the post 104 is the moveable sheave assembly 106. The CVT clutch 100 further includes a removeable ramp assembly 110, engagement members 112, spider 114, a main bias member 116 and the cover 118.

Close-up views of the ramp assembly 110 in this example are provided in FIGS. 3A, 3B and 3C. Ramp assembly 110 includes a central base portion 110a with a central passage 109. Radially extending from the central base portion 110a are a plurality of spaced ramps 110b. Ramp guides 111 are positioned alongside edges of each ramp 110b to help align an associated engagement member to an associated ramp 110b. Each ramp 110b has select ramp profile. Further, the central base portion 110a about the central passage 109, includes an axially extending lip portion 115 that defines in part the ramp assembly central passage 109.

Figure 4A:
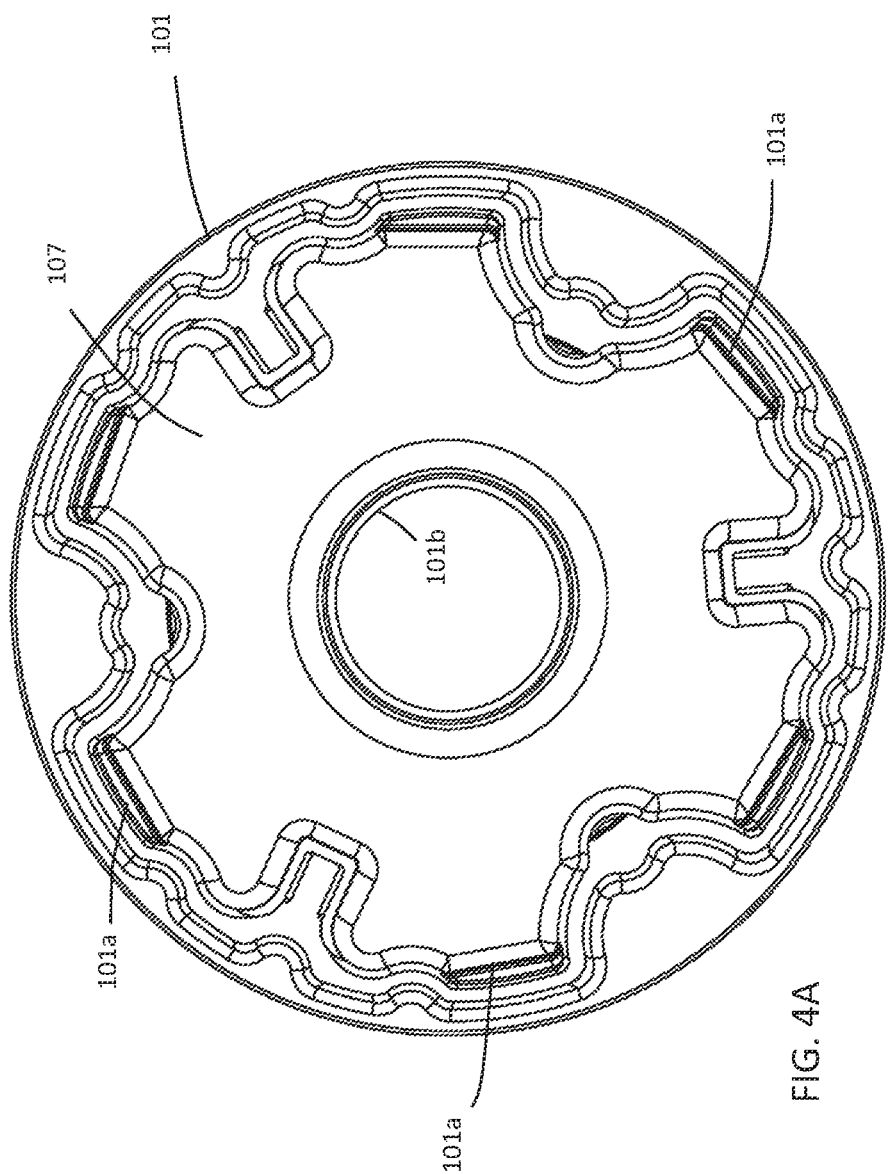
FIG. 4A is an end view of a movable sheave housing according to one exemplary embodiment.

FIG. 4A illustrates a back view of the movable sheave housing 101 of the movable sheave assembly 106. The movable sheave housing 101 includes a recess cavity 107 in which the ramp assembly 110, the engagement members 112, the spider 114 and the main bias member 116 are received. Within the recess cavity 107 of the movable sheave housing 101 is formed seating shoulders 101a that are designed to engage distal ends of the ramps 110b of the ramp assembly 110. FIG. 4B illustrates the ramp assembly 110 received within the recess cavity 107 of the movable sheave housing 101. The central passage 109 of the ramp assembly 110 is received around a central hub 101b of the housing 101 of the movable sheave assembly 106 in his example.

Referring to FIG. 5A, a cross-sectional side view of the CVT clutch 100 in an idle configuration is illustrated. In this configuration, the centrifugal forces are low (or not present) so the main bias member 116 is able to exert a bias force on the cover 118 (which is attached to the movable sheave assembly 106) to push the housing 101 of the moveable sheave assembly 106 axially away from the fixed sheave 102 on the post 104. The main bias member 116 (positioned between the cover 118 and the spider 114) is able to generate the bias force because the spider 114 is axially locked on the post 104. In this idle configuration, a belt (not shown) will ride on an idler bearing 105 that that rotates freely on the post. Other styles of clutches beside idler-style clutches may be used.

As illustrated in FIG. 5A, the engagement member, which are rollers in this example, engage the ramp surfaces of the ramps 110b of the ramp assembly 110. One feature of the CVT clutch 100 design is that there is at least one space 130 and 132 between each ramp 110b and a sheave face 101c of the movable sheave housing 101 of the movable sheave assembly 106. The space 130 allows an air barrier between each ramp 110b and the sheave face 101c of the movable sheave housing 101 within the recess cavity 107. The gap helps reduce heat transfer from the sheave face 101c (caused by friction when a belt (not shown) engages the sheave face 101c) to the engagement members 112. The reduction of heat transfer provides less plastic deformation of the engagement member 112 as well as allowing for the use of lower melting plastics to be used on engagement members 112 that are rollers in this example. In other example, the engagement members 112 may be wedged shaped or yet another shaped. Another benefit is a reduction in the weight of the CVT clutch 100 by removing unneeded material between the ramps 110b and the sheave face 101c of the movable sheave housing 101.

FIG. 5B illustrates cross-sectional side view of CVT clutch 100 in a top end configuration where the engagement members 112 have moved up ramp surfaces of the respective ramps 110b during a high rotation rate of the CVT clutch 100. The engagement members 112 pushing on the spider 114 as they move up the respective ramps 110b counters the bias force of the main bias member 116 (compresses the main bias member 116 in this example) moving the moveable sheave assembly 106 axially towards the fixed sheave 102 on the post 104. In this configuration, a belt (not shown) engaging (clamped between) the sheave faces of the fixed sheave and moveable sheave would be positioned farther away from a center of rotation (center axis) of the CVT clutch 100.

One feature of the CVT clutch 100 is that the ramp assembly 110 can be easily replaced. This is an important feature because different ramp assemblies 110 having ramps 110b with different ramp profiles can be swapped out to change the shifting characteristics of the CVT clutch 100. This may be desirable depending on the vehicle the CVT clutch 100 is being used in in and what is the anticipated use of the vehicle. The drop in design of the ramp assembly 110 and housing 101 of the movable sheave assembly provides a CVT clutch with replaceable ramps having different ramp profiles to change the shifting characteristics of the CVT clutch 100.

The ramp assembly 110, described above, is illustrated as being one single piece that includes all the ramps 110b. In other example embodiments the ramp assembly may not be a single piece. For example, FIGS. 6A through 6C illustrate different views of a ramp assembly portion 200. A plurality of ramp assembly portions 200 would make up a ramp assembly in this embodiment.

Each ramp assembly portion 200 includes a pair of ramps 200a and 200b. Each pair of ramps 200a and 200b are coupled together via connection portion 202. Within the connection portion is formed a connection passage 203 that is used to couple the ramp assembly portion 200 movable sheave housing 220 of a moveable sheave assembly 221 discussed below. Each ramp in this example includes ramp guides 204 and 205 that extend from opposing side edges of the ramps. In this example, the connection portion 202 is coupled across a distal end edge of ramp guides 205 to couple the pair of ramps 200a and 200b together.

Figure 7A:
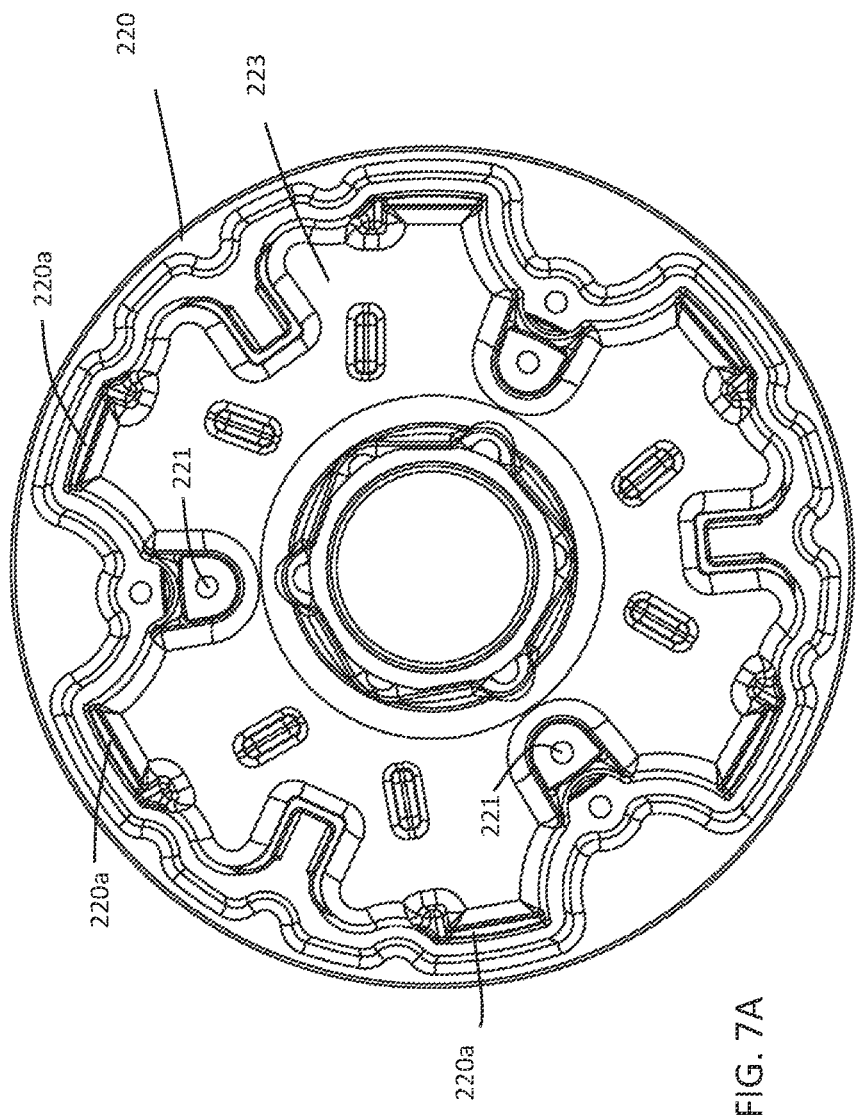
FIG. 7A is an end view of a movable sheave housing according to one exemplary embodiment.
Figure 7B:
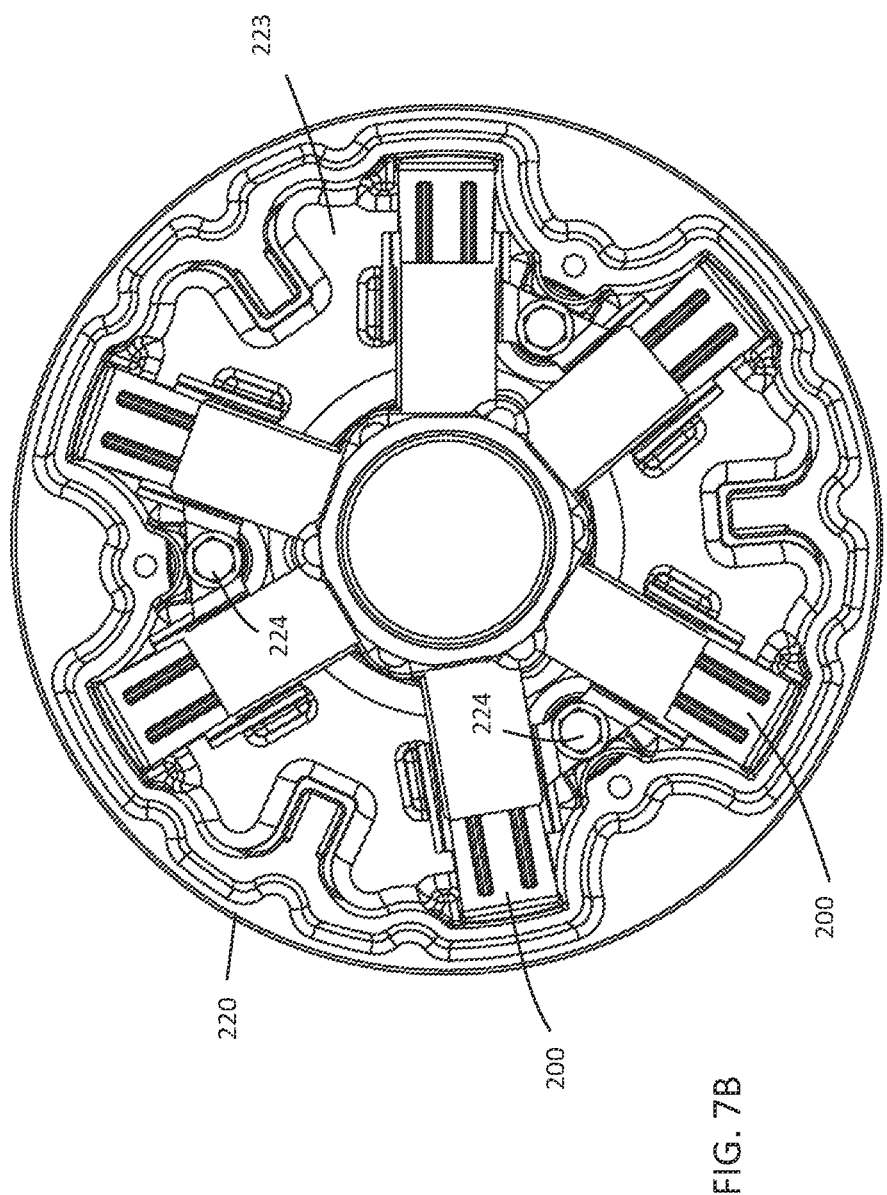
FIG. 7B is an end view of the movable sheave housing of FIG. 7B including ramp portions of FIG. 6A.

Referring to FIG. 7A illustrates a back view of the movable sheave housing 220 of the movable sheave assembly 221 (shown in FIG. 8A). The movable sheave housing 220 includes a recess cavity 223 in which the ramp assembly portions 200, the engagement members 112, the spider 114 and the main bias member 116 are received. Within the recess cavity 223 of the housing 220 of the movable sheave assembly 221 is formed seating shoulders 220a what are designed to engage distal ends of the ramps 200a and 200b of the ramp assembly portions 200. FIG. 7B illustrates ramp assembly portions 200 received within the recess cavity 223 of the movable sheave housing 220 of the movable sheave assembly 221. Fasteners 224 positioned within the connection passage 203 of the connection portion 202 of each ramp assembly portion 200 and engaged with the movable sheave housing 220 hold each ramp assembly portion 200 within the recess cavity 223 of the movable sheave housing 220 of the movable sheave assembly 221. In other embodiments fasteners are not needed. This example includes three ramp assembly portions 200 mounted within the recess cavity 223 of the movable sheave housing 220 of the movable sheave assembly 221.

FIG. 8A, a cross-sectional side view of a CVT clutch 250 using the ramp assembly portions 200 in an idle configuration is illustrated. In the idle configuration, the centrifugal forces are low (or not present) so the main bias member 116 is able to exert a bias force on the cover 118 (which is attached to the moveable sheave housing 220 of the movable sheave assembly 221) to push the moveable sheave housing 220 of the moveable sheave assembly 221 axially away from the fixed sheave 102 on the post 104. The main bias member 116 (positioned between the cover 118 and the spider 114) is able to generate the bias force because the spider 114 is axially locked on the post 104. In this idle configuration, a belt (not shown) will ride on an idler bearing 105 that that rotates freely on the post.

Figure 8B:
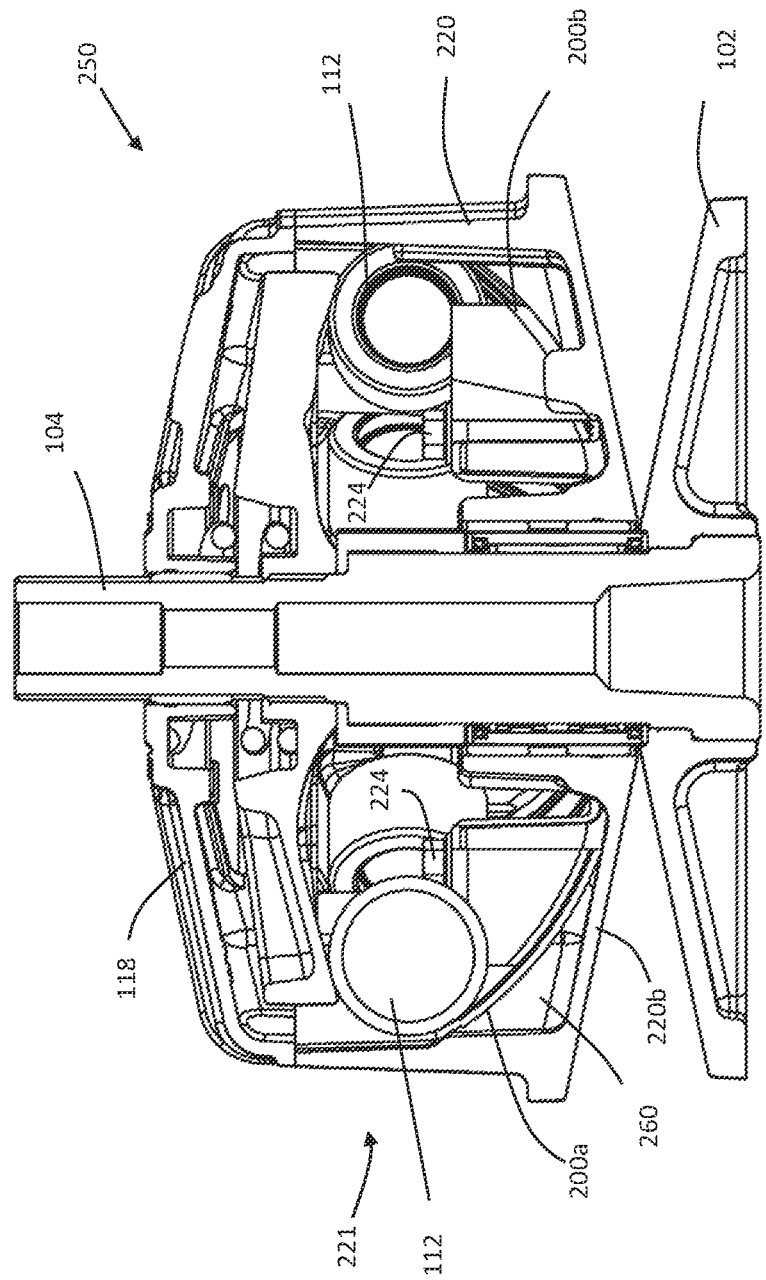
FIG. 8B is a cross-sectional side view of the CVT clutch of FIG. 8A in a top end configuration.

As illustrated in FIG. 8A, the engagement members 112 engage the ramp surfaces of the ramps 200a and 200b of the ramp assembly portions 200. Like the embodiment illustrated above, the design provides for a gap or space 260 between the ramps 200a and 200b and sheave face 220b of the moveable sheave housing 220. The space 260 helps insulate the engagement members 112 from heat generated at the sheave face 220b of the moveable sheave housing 220. As discussed above, this allows for less plastic deformation of the engagement members 112 as well as allowing for the use of engagement members 112 with lower temperature plastics. It also allows for a reduction in weight of the CVT clutch 250. FIG. 8B illustrates cross-sectional side view of CVT clutch 250 in a top end configuration where the engagement members 112 have moved up ramp surfaces of the respective ramps 200a and 200b during a high rotation rate of the CVT clutch 250. Also illustrated in FIG. 8B are the fasteners 224 coupling the ramp assembly portions 200 to the moveable sheave housing 220 of the moveable sheave assembly 221. In one embodiment it is a threaded connection. As discussed above, in other embodiments fasteners are not used.

Another example uses individual ramps 300 as illustrated in FIGS. 9A, 9B and 9C. A plurality of the individual ramps 300 would make up a ramp assembly in this embodiment. Each ramp 300 includes a ramp profile. Each ramp in this example includes spaced side supports 302a and 302b and a ramp surface 301 which engages the engagement members 112.

Figure 10B:
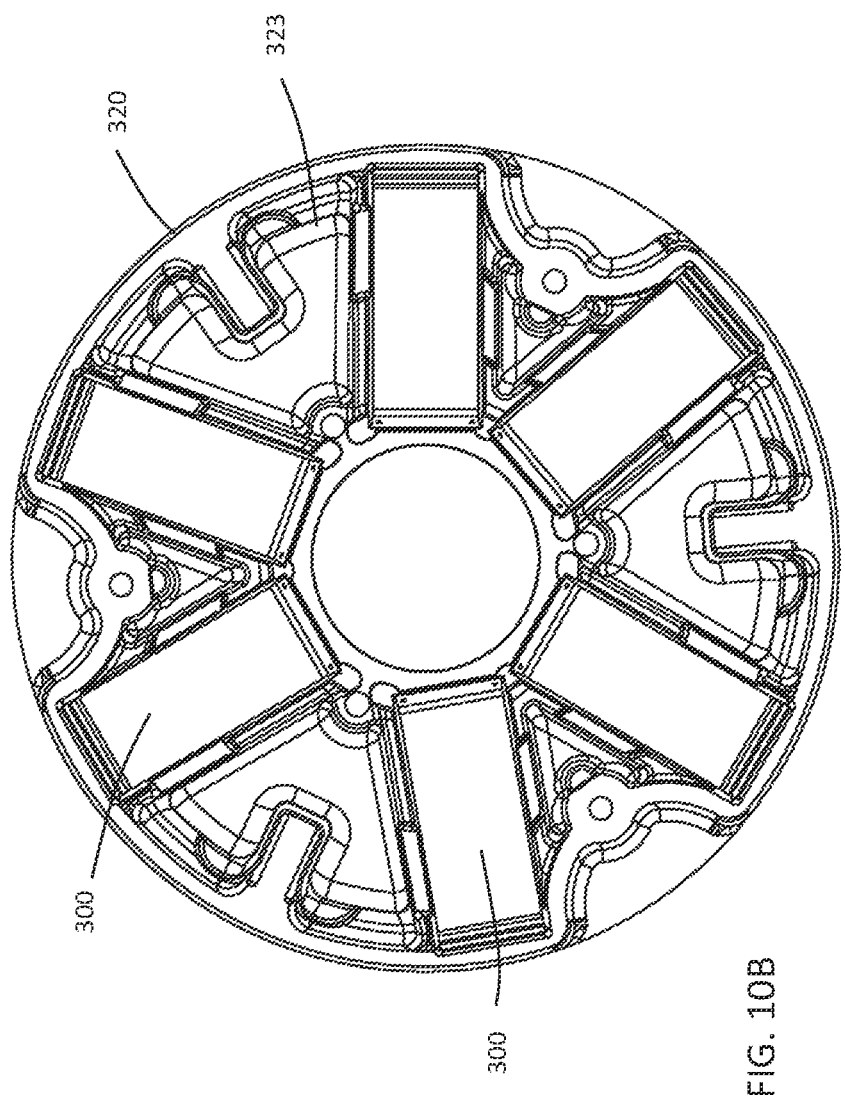
FIG. 10B is an end view of the movable sheave housing of FIG. 10B including ramps of FIG. 9A.

FIG. 10A illustrates a back view of a moveable sheave housing 320 of a movable sheave assembly 330 (shown in FIG. 11A) of a CVT clutch 350. The moveable sheave housing 320 includes a recess cavity 323 in which the ramps 300, the engagement members 112, the spider 114 and the main bias member 116 are received. Within the recess cavity 323 of the moveable sheave housing 320 of the movable sheave assembly 330 is formed seating pockets 322 in which the ramps 300 are received. FIG. 10B illustrates the ramps 300 received within the recess cavity 323 of the moveable sheave housing 320 of the moveable sheave assembly 330. This example includes six ramps 300 positioned within the recess cavity 323 of the moveable sheave housing 320 of the movable sheave assembly 330.

FIG. 11A illustrates a cross-sectional side view of the CVT clutch 350 using ramps 300 in an idle configuration. In the idle configuration, the centrifugal forces are low (or not present) so the main bias member 116 is able to exert a bias force on the cover 118 (which is attached to the moveable sheave housing 320) to push the moveable sheave housing 320 of the moveable sheave assembly 330 axially away from the fixed sheave 102 on the post 104. The main bias member 116 (positioned between the cover 118 and the spider 114) is able to generate the bias force because the spider 114 is axially locked on the post 104. In this idle configuration, a belt (not shown) will ride on an idler bearing 105 that may rotate freely on the post 104.

Figure 11B:
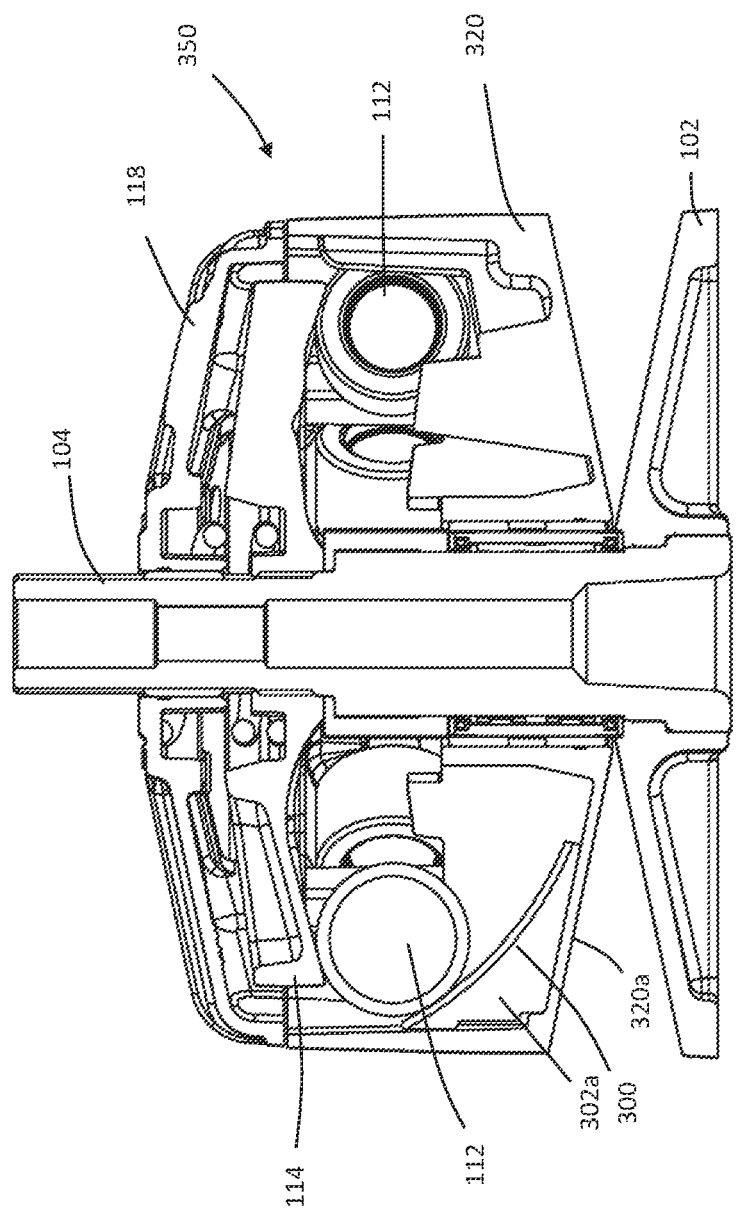
FIG. 11B is a cross-sectional side view of the CVT clutch of FIG. 11A in a top end configuration.

As illustrated in FIG. 11A, the engagement members 112 engage the ramp surfaces 301 of the ramps 300. This example design provides for a gap or space 360 between the ramps 300 and a sheave face 320a of the moveable sheave housing 321 defined by the spaced side supports 302a and 302b of the ramps 300. The space 360 helps insulate the engagement members 112 from heat generated at the sheave face 320a of the moveable sheave housing 320. As discussed above, this allows for less plastic deformation of the engagement members 112 as well as allowing for the use of engagement members 112 with lower temperature plastics. It also allows for a reduction in weight of the CVT clutch 350. FIG. 11B illustrates a cross-sectional side view of CVT clutch 350 in a top end configuration where the engagement members 112 have moved up ramp surfaces of the ramps 300 during a high rotation rate of the CVT clutch 350.

Figure 12:
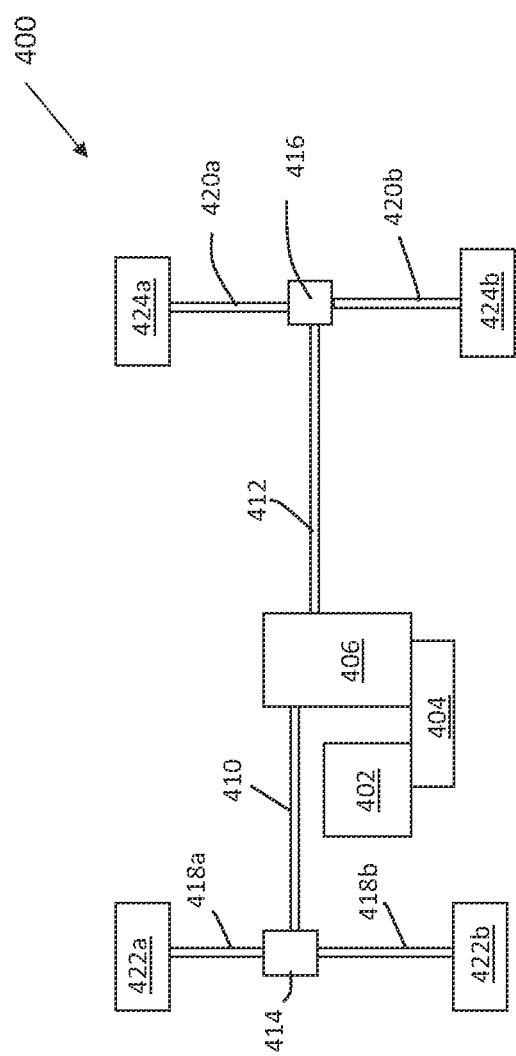
FIG. 12 is a block diagram of a vehicle implementing a CVT clutch according to one exemplary embodiment.

FIG. 12 illustrates a block diagram of a vehicle 400 that implements the CVT clutch described above. The vehicle is illustrated as including a motor 402 that generates engine torque. The motor can be any type of motor that produces torque such as, but not limited to, an internal combustion engine and an electrical motor. A CVT 404 that includes a CVT clutch, as described above, couples torque between the motor 402 and a transmission 406 (which is part or drivetrain) in this example.

The transmission 406 in this example couples torque to a front differential 414 via front prop shaft 410 and torque to a rear differential 416 via rear prop shaft 412. The front differential couples torque to front wheels 422a and 422b via front half shafts 418a and 418b and the rear differential 416 couples torque to the rear wheels 424a and 424b via rear half shafts 420a and 420b.

Figure 13:
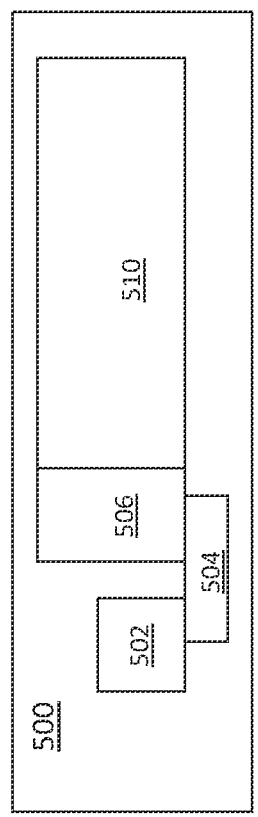
FIG. 13 is a block diagram of another vehicle implementing a CVT clutch according to another exemplary embodiment.

Referring to FIG. 13, another type of vehicle 500 that can implement a CVT clutch described above is illustrated. This type of vehicle implements a track instead of wheels, such as, but limited to a snow machine. Vehicle 500 includes a motor 502 that is in operational communication with CVT 504. The CVT 504 includes the CVT clutch described above. The CVT 504 is in operational communication with the transmission which may include further gearing and/or other connections needed for final coupling of torque to the track 510. The transmission 506 is in operational communication with the track 510.

As described above, the CVT clutch used in the CVT 404 may be adjusted based a desired gear shifting characteristics of the vehicle 400 or 500 by simply exchanging ramp assemblies (or ramps) having different ramp profiles.

Example Embodiments

Example 1 is a CVT clutch including a post, a fixed sheave, a movable sheave, a cover, a spider, at least one interchangeable ramp, an engagement member for each ramp and a main bias member. The fixed sheave is statically mounted on an end of the post. The movable sheave assembly is dynamically mounted on the post. The movable sheave includes a recess cavity that is defined by a movable sheave housing. The cover is selectively coupled to the movable sheave housing to cover the recess cavity of the movable sheave assembly. The spider is statically mounted on the post within the recess cavity of the movable sheave assembly. The at least one interchangeable ramp positioned within the recess cavity so that at least one space is provided between the at least one interchangeable ramp and a sheave face of the movable sheave housing. Each engagement member is positioned to engage an associated interchangeable ramp and the spider. The main bias member is configured to assert a bias force on the spider and cover to position each engagement member at a select location on the associated interchangeable ramp when a countering force is not present.

Example 2 includes the CVT clutch of Example 1, wherein the at least one interchangeable ramp includes an interchangeable ramp assembly having a plurality of ramps.

Example 3 includes the CVT clutch of Example 2, wherein the interchangeable ramp assembly includes a central base portion with a ramp assembly central passage and a plurality of spaced radially extending ramps.

Example 4 includes the CVT clutch of Example 3, further including ramp guides extending from opposite side edges of each ramp to guide each engagement member on an associated ramp.

Example 5 includes the CVT clutch of any of the Examples 3-4, wherein the ramp assembly central passage is received around a central portion of the movable sheave housing that defines a movable sheave central passage.

Example 6 includes the CVT clutch of any of Examples 1-5, wherein the at least one interchangeable ramp includes a plurality of pairs of ramps.

Example 7 includes the CVT clutch of Example 6 wherein each pair of ramps includes a first ramp and a second ramp. A first set of ramp guides extend from opposite side edges of the first ramp. A second set of ramp guides extending from opposite side edges of the second ramp. A connection portion is coupled across one of the ramp guides of the first set of ramp guides and one of the ramp guides of the second set of ramp guides. The connection portion includes a connection passage that is configured to the pair of ramps to the movable sheave housing within the cavity of the movable sheave assembly.

Example 8 includes the CVT clutch of any of the Examples 1-7, wherein the movable sheave housing includes a seating shoulder for each interchangeable ramp within the cavity of the movable sheave assembly. A distal end of each interchangeable ramp resting on an associated seating shoulder.

Example 9 includes the CVT clutch of any of the Examples 1-8, wherein the movable sheave housing includes seating pockets for each interchangeable ramp within the recess cavity of the movable sheave assembly.

Example 10 includes the CVT clutch of any of the Examples 1-9 wherein each interchangeable ramp includes spaced side supports.

Example 11 is a CVT clutch including a post, a fixed sheave, a movable sheave, a cover, a spider, an interchangeable ramp assembly, an engagement member for each ramp of the interchangeable ramp assembly and a main bias member. The fixed sheave is statically mounted on an end of the post. The movable sheave assembly is dynamically mounted on the post. The movable sheave assembly includes a recess cavity defined by a movable sheave housing. The cover is selectively coupled to the movable sheave housing to cover the recess cavity of the movable sheave assembly. The spider is statically mounted on the post within the recess cavity of the movable sheave assembly. The interchangeable ramp assembly is received within the recess cavity. The interchangeable ramp assembly includes a central base portion with a ramp assembly central passage and a plurality of spaced radially extending ramps. Each engagement member is positioned to engage an associated ramp and the spider. The main bias member is configured to assert a bias force on the spider and cover to position each engagement member at a select location on the associated ramp.

Example 12 includes the CVT clutch of Example 11 wherein each ramp of the interchangeable ramp assembly is positioned within the recess cavity so that at least one space is provided between each ramp and the movable sheave housing of the movable sheave assembly to aid in heat transfer.

Example 13 includes the CVT clutch of any of the Examples 11-12, wherein the ramp assembly central passage is received around a central portion of the movable sheave housing that defines a movable sheave central passage.

Example 14 includes the CVT clutch of any of the Examples 11-13, wherein the movable sheave housing includes a seating shoulder for each ramp of the interchangeable ramp assembly within the cavity of the movable sheave assembly. A distal end of each ramp rests on an associated seating shoulder.

Example 15 is a vehicle with a continuously variable transmission (CVT) clutch, the vehicle including a motor to generate engine torque, a CVT and a drivetrain operationally coupled to the CVT. The CVT is operationally coupled to the motor. The CVT includes the CVT clutch. The CVT clutch includes a post, a fixed sheave, a movable sheave, a cover, a spider, at least one interchangeable ramp, an engagement member for each ramp, and a main bias member. The fixed sheave is statically mounted on an end of the post. The movable sheave assembly is dynamically mounted on the post. The movable sheave includes a recess cavity defined by a movable sheave housing. The cover is selectively coupled to the movable sheave housing to cover the recess cavity of the movable sheave assembly. The spider is statically mounted on the post within the recess cavity of the movable sheave assembly. The at least one interchangeable ramp is received within the recess cavity. The at least one interchangeable ramp is positioned within the recess cavity so that at least one space is provided between the at least one interchangeable ramp and a sheave face of the movable sheave housing. Each engagement member is positioned to engage an associated interchangeable ramp and the spider. The main bias member is configured to assert a bias force on the spider and cover to position each engagement member at a select location on the associated interchangeable ramp. The drivetrain is operationally coupled to the CVT.

Example 16 includes the vehicle of Example 15, wherein the at least one interchangeable ramp of the CVT clutch includes an interchangeable ramp assembly that includes a plurality of ramps.

Example 17 includes the vehicle of Example 16, wherein the interchangeable ramp assembly includes a central base portion with a ramp assembly central passage and a plurality of spaced radially extending ramps.

Example 18 includes the vehicle of Example 17, wherein the interchangeable ramp assembly central passage of the ramp assembly is received around a central portion of the movable sheave housing that defines a movable sheave central passage.

Example 19 includes the vehicle of any of the Examples 15-18, wherein the drivetrain includes at least one of a pair of wheels and a track.

Example 20 includes the vehicle of any of the Examples 15-19 wherein the movable sheave housing of the movable sheave assembly includes a seating shoulder for each interchangeable ramp within the cavity of the movable sheave assembly. A distal end of each interchangeable ramp resting on an associated seating shoulder.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A continuously variable transmission (CVT) clutch comprising:
   a post;
   a fixed sheave statically mounted on an end of the post;
   a movable sheave assembly dynamically mounted on the post, the movable sheave assembly including a recess cavity defined by a movable sheave housing;
   a cover selectively coupled to the movable sheave housing to cover the recess cavity of the movable sheave assembly;
   a spider statically mounted on the post within the recess cavity of the movable sheave assembly;
   at least one interchangeable ramp, the at least one interchangeable ramp positioned with the recess cavity so that at least one space is provided between the at least one interchangeable ramp and a sheave face of the movable sheave housing;
   an engagement member for each interchangeable ramp, each engagement member positioned to engage an associated interchangeable ramp and the spider; and
   a main bias member configured to assert a bias force on the spider and cover to position each engagement member at a select location on the associated interchangeable ramp when a countering force is not present.

2. The CVT clutch of claim 1, wherein the at least one interchangeable ramp includes an interchangeable ramp assembly having a plurality of ramps.

3. The CVT clutch of claim 2, wherein the interchangeable ramp assembly further comprising:
a central base portion with a ramp assembly central passage; and
a plurality of spaced radially extending ramps.

4. The CVT clutch of claim 3, further comprising:
ramp guides extending from opposite side edges of each ramp to guide each engagement member on an associated ramp.

5. The CVT clutch of claim 3, wherein the ramp assembly central passage is received around a central portion of the movable sheave housing that defines a movable sheave central passage.

6. The CVT clutch of claim 1, wherein the at least one interchangeable ramp includes a plurality of pairs of ramps.

7. The CVT clutch of claim 6, wherein each pair of ramps comprises:
a first ramp;
a first set of ramp guides extending from opposite side edges of the first ramp;
a second ramp;
a second set of ramp guides extending from opposite side edges of the second ramp; and
a connection portion coupled across one of the ramp guides of the first set of ramp guides and one of the ramp guides of the second set of ramp guides, the connection portion including a connection passage configured to the pair of ramps to the movable sheave housing within the cavity of the movable sheave assembly.

8. The CVT clutch of claim 1, wherein the movable sheave housing includes a seating shoulder for each interchangeable ramp within the recess cavity of the movable sheave assembly, a distal end of each interchangeable ramp resting on an associated seating shoulder.

9. The CVT clutch of claim 1, wherein the movable sheave housing includes seating pockets for each interchangeable ramp within the cavity of the movable sheave assembly.

10. The CVT clutch of claim 1, wherein each interchangeable ramp includes spaced side supports.

11. A continuously variable transmission (CVT) clutch comprising:
a post;
a fixed sheave statically mounted on an end of the post;
a movable sheave assembly dynamically mounted on the post, the movable sheave assembly including a recess cavity defined by a movable sheave housing;
a cover selectively coupled to the movable sheave housing to cover the recess cavity of the movable sheave assembly;
a spider statically mounted on the post within the recess cavity of the movable sheave assembly;
an interchangeable ramp assembly received within the recess cavity, the interchangeable ramp assembly including,
a central base portion with a ramp assembly central passage, and
a plurality of spaced radially extending ramps;
an engagement member for each ramp of the interchangeable ramp assembly, each engagement member positioned to engage an associated ramp and the spider; and
a main bias member configured to assert a bias force on the spider and cover to position each engagement member at a select location on the associated ramp.

12. The CVT clutch of claim 11, wherein each ramp of the interchangeable ramp assembly is positioned within the recess cavity so that at least one air space is provided between each ramp and a sheave face of the movable sheave housing of the movable sheave assembly.

13. The CVT clutch of claim 11, wherein the ramp assembly central passage is received around a central portion of the movable sheave housing that defines a movable sheave central passage.

14. The CVT clutch of claim 11, wherein the movable sheave housing includes a seating shoulder for each ramp of the interchangeable ramp assembly within the cavity of the movable sheave assembly, a distal end of each ramp resting on an associated seating shoulder.

15. A vehicle with a continuously variable transmission (CVT) clutch, the vehicle comprising:
a motor to generate engine torque;
a CVT operationally coupled to the motor, the CVT including the CVT clutch, the CVT clutch including,
a post,
a fixed sheave statically mounted on an end of the post,
a movable sheave assembly dynamically mounted on the post, the movable sheave including a recess cavity defined by a movable sheave housing,
a cover selectively coupled to the movable sheave housing to cover the recess cavity of the movable sheave assembly,
a spider statically mounted on the post within the recess cavity of the movable sheave assembly,
at least one interchangeable ramp received within the recess cavity, the at least one interchangeable ramp positioned within the recess cavity so that at least one space is provided between the at least one interchangeable ramp and a sheave face of the movable sheave housing,
an engagement member for each interchangeable ramp, each engagement member positioned to engage an associated interchangeable ramp and the spider, and
a main bias member configured to assert a bias force on the spider and cover to position each engagement member at a select location on the associated interchangeable ramp; and
a drivetrain operationally coupled to the CVT.

16. The vehicle of claim 15, wherein the at least one interchangeable ramp of the CVT clutch includes an interchangeable ramp assembly that includes a plurality of ramps.

17. The vehicle of claim 16, wherein the interchangeable ramp assembly comprises:
a central base portion with a ramp assembly central passage; and
a plurality of spaced radially extending ramps.

18. The vehicle of claim 17, wherein the interchangeable ramp assembly central passage of the ramp assembly is received around a central portion of the movable sheave housing that defines a movable sheave central passage.

19. The vehicle of claim 15, wherein the drivetrain includes at least one of a pair of wheels and a track.

20. The clutch of claim 15, wherein the movable sheave housing of the movable sheave assembly includes a seating shoulder for each interchangeable ramp within the cavity of the movable sheave assembly, an end of each interchangeable ramp resting on an associated seating shoulder.

* * * * *